United States Patent
Muller et al.

(10) Patent No.: US 12,505,459 B2
(45) Date of Patent: Dec. 23, 2025

(54) METHODS AND SYSTEMS FOR CROSS-PLATFORM OVERLAP MODELING

(71) Applicant: iSpot.tv, Inc., Bellevue, WA (US)

(72) Inventors: Sean Muller, Redmond, WA (US); Michael Bardaro, Snoqualmie, WA (US); Dipti Shah, Pleasanton, CA (US); Vijoy Gopalakrishnan, Algonquin, IL (US); Sam Hui, Houston, TX (US); Jonathan Woodard, Renton, WA (US)

(73) Assignee: iSpot.tv, Inc., Bellevue, WA (US)

( * ) Notice: Subject to any disclaimer, the term of this patent is extended or adjusted under 35 U.S.C. 154(b) by 16 days.

(21) Appl. No.: 18/652,732

(22) Filed: May 1, 2024

(65) Prior Publication Data

US 2025/0014053 A1    Jan. 9, 2025

Related U.S. Application Data

(60) Provisional application No. 63/525,108, filed on Jul. 5, 2023.

(51) Int. Cl.
*G06Q 30/0201* (2023.01)

(52) U.S. Cl.
CPC ............... *G06Q 30/0201* (2013.01)

(58) Field of Classification Search
CPC ................................. G06Q 30/0201
See application file for complete search history.

(56) References Cited

U.S. PATENT DOCUMENTS

2019/0043080 A1 * 2/2019 Buchalter .......... G06Q 30/0245

OTHER PUBLICATIONS

Papadopoulos, Panagiotis, Nicolas Kourtellis, and Evangelos P. Markatos. "The cost of digital advertisement: Comparing user and advertiser views." Proceedings of the 2018 World Wide Web Conference. 2018. (Year: 2018).*

* cited by examiner

*Primary Examiner* — Emmett K. Walsh
(74) *Attorney, Agent, or Firm* — Kory D. Christensen

(57) ABSTRACT

A multivariate probit model is used to determine overlaps for reach and impressions for a plurality of different platforms.

25 Claims, 4 Drawing Sheets

METHODS AND SYSTEMS FOR CROSS-PLATFORM OVERLAP MODELING

CROSS-REFERENCE TO RELATED APPLICATIONS

This application claims the benefit of U.S. Provisional Application No. 63/525,108, filed Jul. 5, 2023, for METHODS AND SYSTEMS FOR CROSS-PLATFORM OVERLAP MODELING, which is incorporated herein by reference.

TECHNICAL FIELD

The present disclosure relates to techniques for estimating overlap for reach, frequency, and impressions across a number of platforms.

BACKGROUND

Understanding the extent to which a population has been exposed to a particular content item can be extremely valuable. Statistics including reach, impressions, and frequency are typical measures of such exposure. "Reach" refers to the number of people that will potentially be exposed to the content item at least once in a set period of time. "Impressions" are individual instances of the person being exposed to the content item. "Frequency" is how many times each person will be exposed to the same content item within a given time frame.

Technology exists for tracking and reporting statistics for reach, impressions, and frequency for various platforms. For example, for linear television (i.e., traditional broadcast or cable TV with predetermined commercial breaks), some televisions employ automatic content recognition (ACR) to identify the content playing on the screen, generating statistics on the number of times each particular content item is displayed. Based on the network addresses (e.g., IP address) of the televisions, a third-party service can aggregate reach and impressions statistics for potentially millions of identifiable households and devices.

For other platforms, such as over-the-top (OTT) or streaming platforms, reach and impressions can be tracked in different ways. For example, iSpot.tv, Inc. of Bellevue, Washington, inserts "pixels" into streaming content. The iSpot pixel is an invisible image with dimensions of 1×1 pixels (also called a pixel tag) that is loaded whenever a user visits a webpage or is served a content item. The pixel is used to collect end-user data in a PII compliant manner to measure OTT media performance and to connect linear TV and website conversion data. The pixel allows iSpot.tv to relate these data points primarily based on IP address to provide a measurement of all TV/OTT media and conversion metrics within a household. The iSpot-UM (Unified Measurement) product allows iSpot.tv to provide reach, impression, and frequency statistics for millions of identifiable households based on a combination of the ACR and pixel data.

Some platforms, however, do not identify households or devices when providing statistics for reach and impressions. For example, YouTube® is an online video sharing and social media platform headquartered in San Bruno, California. Content creators upload about 3.7 million videos every day. Almost 5 billion videos are watched on YouTube daily by more than 30 million visitors. The primary way that YouTube monetizes the service is displaying ads. Reach and impression statistics for YouTube are available from Google, Inc., via its Ads Data Hub (ADH). Unfortunately, because YouTube does not provide identification information, it is impossible to determine overlap in reach and impressions (and frequency) between YouTube and either linear or OTT using conventional techniques.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one aspect, a computer-implemented method is disclosed for determining the proportion of a population that is exposed during a time interval to a content item by one or a combination of a plurality of platforms (i.e., N platforms). The method includes receiving first reach statistics comprising the proportion of the population exposed during the time interval to the content item by a first platform, wherein the first platform identifies at least one of a household or device that displayed the content item using the first platform.

The method also includes receiving second reach statistics comprising the proportion of the population exposed during the time interval to the content item by a second platform, wherein the second platform identifies the at least one of the household or the device that displayed the content item using the second platform.

The method further includes receiving third reach statistics comprising the proportion of the population exposed during the time interval to the content item by a third platform, wherein the third platform does not identify the at least one of the household or the device that displayed the content item using the third platform.

In addition, the method includes calculating overlap reach statistics comprising the proportion of the population exposed to the content item during the time interval by both the first platform and the second platform. The overlap reach statistics may be calculated with reference to identification information, e.g., IP addresses, for the households or devices.

The method also includes using a multivariate probit model with the first reach statistics, the second reach statistics, the third reach statistics, and the overlap reach statistics to calculate at least one of: the proportion of the population that is not exposed to the content item during the time interval by any of the platforms; the proportion of the population that is exposed to the content item during the time interval by only one of the platforms; the proportion of the population that is exposed to the content item during the time interval by at least two of the platforms but not by one of the platforms; or the proportion of the population that is exposed to the content item during the time interval by all of the platforms.

According to another aspect, a system is disclosed for performing the aforementioned method for determining the proportion of a population that is exposed during a time interval to a content item by one or a combination of a plurality of platforms.

BRIEF DESCRIPTION OF THE DRAWINGS

The accompanying Figures and Examples are provided by way of illustration and not by way of limitation. The foregoing aspects and other features of the disclosure are explained in the following description, taken in connection with the accompanying example figures relating to one or more embodiments, in which.

DETAILED DESCRIPTION

For the purposes of promoting an understanding of the principles of the present disclosure, reference will now be made to various embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

As used herein, the articles "a" and "an" refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

The use herein of "including," "comprising," or "having," and variations thereof, is meant to encompass the elements listed thereafter and equivalents thereof as well as additional elements. As used herein, "and/or" refers to and encompasses any and all possible combinations of one or more of the associated listed items, as well as the lack of combinations where interpreted in the alternative ("or").

The present disclosure also contemplates that in some embodiments, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical terms used herein have the same meaning as commonly understood by one of ordinary skill in the art to which this disclosure belongs.

Figure 1:
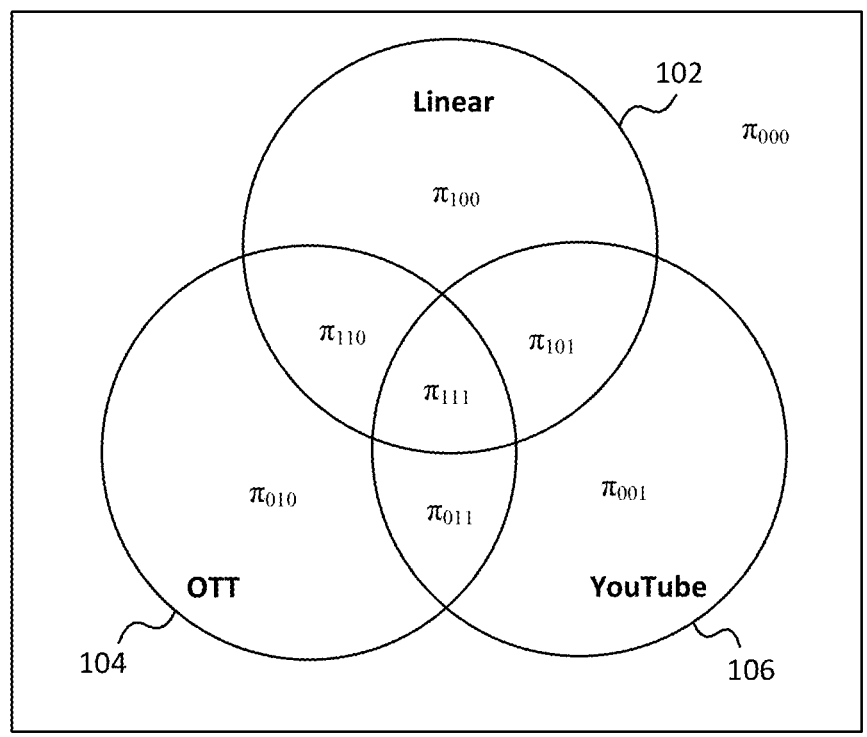
FIG. 1 is a graphical representation of overlap in reach statistics for a plurality of platforms.

FIG. 1 is a Venn diagram depicting the potential overlaps between linear 102 (e.g., cable TV) and OTT 104 (e.g., streaming) media, both of which may identify impressions on a device level, and a platform that only provides aggregate (non-identified) statistics, such as YouTube 106. In the present example, statistics for linear 102 may be obtained from automatic content recognition (ACR) data on a suitably equipped television available, for example, from Vizio Inc., whereas statistics for OTT 104 may be obtained from pixel tags embedded by iSpot.tv, Inc. As noted, the statistics for YouTube 106 may be obtained from Google's ADH.

While linear 102, OTT 104, and YouTube 106 are provided as examples, those skilled in the art will recognize that any other platform that serves media content could be used within the scope of the present disclosure. Furthermore, the number of platforms need not be limited to three, but could be generalized to N, where N≥2. Therefore, references to linear 102, OTT 104, and YouTube 106 should not be considered limiting.

Throughout the present disclosure, the variable $\mu_{ijk}$ is used to refer to the proportion or percentage of a population that is exposed to a content item (e.g., ad). The 1st subscript i (i=0, 1) is used to denote exposure on linear 102, the 2nd subscript j (j=0, 1) to denote exposure on OTT 104, and the 3rd subscript k (k=0, 1) to denote exposure on YouTube 106. Companies (brands) would like to know at least the following eight parameters as depicted in FIG. 1 (additional subscripts and parameters would be possible if N>3):

$\pi_{000}$: Proportion of a population that are not exposed to a content item on linear 102, OTT 104, or YouTube 106;

$\pi_{001}$: Proportion of the population that are exposed to a content item only on YouTube 106;

$\pi_{010}$: Proportion of the population that are exposed to a content item only on OTT 104;

$\pi_{011}$: Proportion of the population that are exposed to a content item on both OTT 104 and YouTube 106, but not linear 102;

$\pi_{100}$: Proportion of the population that are exposed to a content item only on linear 102;

$\pi_{101}$: Proportion of the population that are exposed to a content item on both linear 102 and YouTube 106, but not on OTT 104;

$\pi_{110}$: Proportion of the population that are exposed to a content item on both linear 102 and OTT 104, but not on YouTube 106; and $\pi_{111}$: Proportion of the population that are exposed to a content item on linear 102, OTT 104, and 106 YouTube (all three platforms).

In the present context, "population" may include the population of a particular geographic region (e.g., country, state, city), and may be further subdivided by a household living at the same address and/or a particular demographic, e.g., persons over 18.

Unfortunately, none of the preceding quantities are known given that YouTube's statistics are only provided in the aggregate (i.e., the total impressions, reach, and frequency) without reference to households or devices within the households on which the content is displayed. As such, the overlap, for example, between YouTube 106 and linear 102 or between YouTube 106 and OTT 104, cannot be directly calculated.

As used herein, the entire vector of reach proportions is denoted as $\vec{\pi}$. In addition, the conventional "dot" (.) notation is used to denote marginal sums, e.g., $$\pi_{11\cdot} = \pi_{110} + \pi_{111}$$

$$\pi_{1\cdot 0} = \pi_{100} + \pi_{110}$$

$$\pi_{\cdot 01} = \pi_{001} + \pi_{101}$$

$$\pi_{\cdot\cdot 1} = \pi_{001} + \pi_{011} + \pi_{101} + \pi_{111}$$

$$\pi_{1\cdot\cdot} = \pi_{100} + \pi_{101} + \pi_{110} + \pi_{111}$$

and so on.

If device-level data for each of the foregoing were available, $\vec{\pi}$ could be calculated directly. However, in the foregoing example, only the following "ground truth" data is known:

(From ACR data) Total Linear Reach $\pi_{1\cdot\cdot} = \pi_{100} + \pi_{101} + \pi_{110} + \pi_{111}$ (From iSpot pixel data) Total OTT Reach $\pi_{\cdot 1 \cdot} = \pi_{010} + \pi_{011} + \pi_{110} + \pi_{111}$ (From ADH) Total YouTube Reach $\pi_{\cdot \cdot 1} = \pi_{001} + \pi_{011} + \pi_{101} + \pi_{111}$ (From ACR/iSpot pixel data) Linear and OTT overlap $\pi_{11 \cdot} = \pi_{110} + \pi_{111}$ Clearly, there are more unknowns than equations. Thus, the system of equations is under-identified and the desired values cannot be calculated using traditional techniques.

Figure 2:
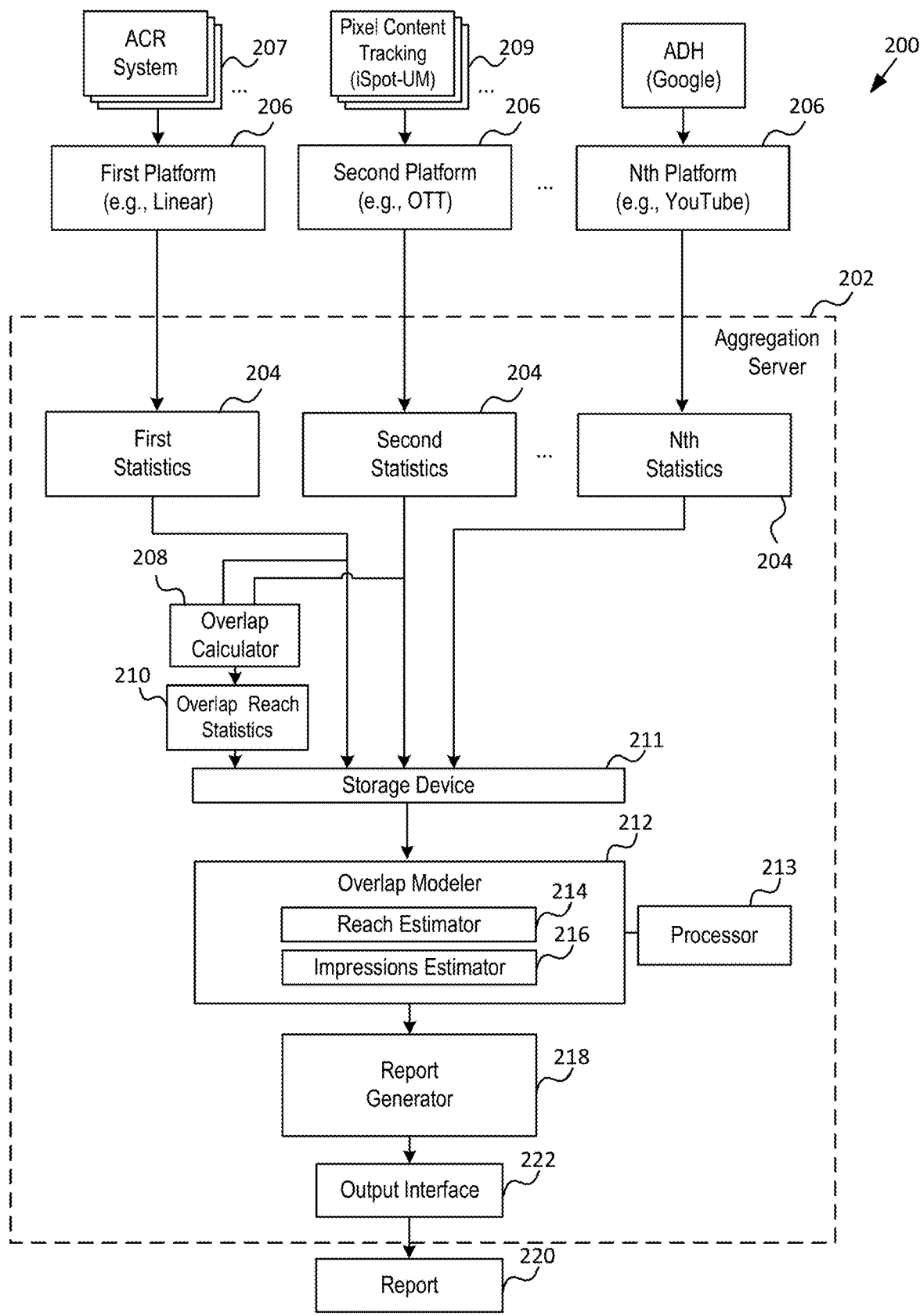
FIG. 2 is a schematic diagram of a system for cross-platform overlap modeling.

The present disclosure solves the aforementioned problem by the use of modeling where certain data are not available. Referring to FIG. 2, a system 200 for cross-platform overlap modeling includes, in one embodiment, an aggregation server 202, which receives statistics 204 (e.g., reach, impressions, frequency) from N different platforms 206. The aggregation server 202 may include, by way of example and not of limitation, one or more processors, memory devices, mass storage devices, I/O interfaces, network interfaces, databases, and/or other suitable devices and software for performing the methods discussed herein.

In the present example, the platforms 206 may include a first platform, a second platform, and up to an Nth platform. Without limitation, the first platform 206 may be linear 102 (e.g., cable TV), the second platform 206 may be OTT 104 (e.g., streaming TV), and the Nth platform may be a video sharing system (e.g., YouTube 106). The first platform 206 may obtain impression statistics 204 from automatic content recognition (ACR) systems 207 (or other means) within individual televisions available from, e.g., Vizio, Inc. For example, the ACR systems 207 may sample audio and/or video playing on the televisions, process the sample, and compare it to a database of content to identify it by its unique characteristics.

The second platform 206 may receive statistics 204 from a pixel content tracking system 209 (or other means) in individual televisions or attached media devices. For example, iSpot.tv, Inc. of Bellevue, Washington, inserts "pixels" into streaming content. The iSpot pixel is an invisible image with dimensions of 1×1 pixels (also called a pixel tag) that is loaded whenever a user visits a webpage or is served a content item. The iSpot-UM service may identify the particular television or other device (e.g., tablet, game console) on which the content item is displayed based on the Internet Protocol (IP) address.

By contrast, the Nth platform 206 (e.g., YouTube) does not identify which devices or households displayed which content items. Without limitation, the Nth platform 206 may include statistics obtained by ADH, a service of Google, Inc.

There is no limit on the number or types of different platforms 206 (or the means for tracking reach and impressions statistics) within the scope of the present disclosure. Furthermore, the greater the number of platforms 206, the more difficult it is to estimate reach and impressions without the principles of the present disclosure because the unknown variables increase to $2^N$. For example, for N=4, the number of variables is 16, whereas if N=5, the number of variables is 32.

In one embodiment, the aggregation server 202 may include an overlap calculator 208 to calculate overlap reach statistics 210 between the first statistics 204 and the second statistics 204 (e.g., where N=3). In other words, the overlap calculator 208 may determine the linear 102 and OTT 104 overlap, i.e., $\pi_{11 \cdot} = \pi_{110} + \pi_{111}$ (shown in FIG. 1), based on the identification information in the first statistics 204 and second statistics 204.

As an example, a television may have an IP address of 1.1.1.1. At 2:14 pm, a user may be watching cable TV when a particular content item is displayed. The ACR function of the TV would record an impression for the content item. At 3:30 pm, the user may be watching Hulu® and be exposed to the same content item, which would be identified when an iSpot pixel is rendered. As a result, statistics 204 may be stored for both the linear 102 (cable TV) and OTT 104 (Hulu®) impressions. The overlap calculator 208 would also determine that an impression occurred for the overlap of linear 102 and OTT 104 (i.e., $\pi_{11 \cdot} = \pi_{110} + \pi_{111}$) to produce the overlap reach statistics 210.

In one embodiment, the first, second, and nth statistics 204 (and calculated overlap reach statistics 210) may be stored in a storage device 111 (e.g., hard disk drive, random access memory, cloud storage). Thereafter, an overlap modeler 212, which may be a software program implemented by a processor 213 executing instructions stored in a memory, may receive the statistics 204, 210 from the storage device 211. In one embodiment, the overlap modeler 212 uses a multivariate probit model, which is a generalization of a probit model for estimating several correlated binary outcomes jointly. The overlap modeler 212 may include various sub-modules, such as a reach estimator 214 for determining various overlaps in reach statistics, and an impressions estimator 216 for determining various overlaps in impression statistics, as described in greater detail below.

Overlap Analysis for Reach (Reach Estimator 214)

In one embodiment, the multivariate probit model takes as input a mean vector corresponding to a total reach of the first platform, the second platform, and the third platform, respectively, as well as correlation matrix including correlation parameters relating a probability of an individual watching a first content item on both the first platform and the second platform, a probability of the individual watching the first content item on both the first platform and the third platform, and the probability of the individual watching the first content item on both the second platform and the third platform.

Mathematically, the multivariate probit model used by the overlap modeler 212 may be expressed as follows:

$$\begin{pmatrix} u_1 \\ u_2 \\ u_3 \end{pmatrix} \sim MVN \left( \begin{bmatrix} \mu_1 \\ \mu_2 \\ \mu_3 \end{bmatrix}, \begin{bmatrix} 1 & r & v \\ r & 1 & w \\ v & w & 1 \end{bmatrix} \right) \quad \text{Eq. [1]}$$

$$[z_i = 1] \Leftrightarrow [u_i > 0] \quad \text{Eq. [2]}$$

where $z_1$ is an indicator variable for linear exposure that takes a value of 1 if a household is exposed on linear (and 0 otherwise); $z_2$ is an indicator variable for OTT exposure that takes value of 1 if the household is exposed on OTT (and 0 otherwise), and $z_3$ is an indicator variable for YouTube exposure that takes value of 1 if the household is exposed on YouTube (and 0 otherwise). Following the multivariate Probit formulation, $u_i$'s are latent variables that are connected to the observed $z_i$'s per Eq. [2].

Thus, Eq. [1]-[2] reparametrizes the reach parameter vector It using the multivariate Probit parameters, i.e., the mean vector $\vec{\mu} = (\mu_1, \mu_2, \mu_3)$ and correlation parameters r (which governs the correlation between linear 102 and OTT 104), v (which governs the correlation between linear 102 and YouTube 106) and w (which governs the correlation between OTT 104 and YouTube 106), which together define the correlation matrix $$\Sigma = \begin{bmatrix} 1 & r & v \\ r & 1 & w \\ v & w & 1 \end{bmatrix}.$$

After the multivariate Probit parameters $\Theta=(\mu_1, \mu_2, \mu_3, r, v, w)$ are calibrated (as described below), $\vec{\pi}$ can be computed by the reach estimator 214 analytically from Eq. [1] through the appropriate integrals, e.g., $$\pi_{001} = Pr(z_1 = 0, z_2 = 0, z_3 = 1) \quad \text{Eq. [3]}$$
$$= Pr(u_1 < 0, u_2 < 0, u_3 \geq 0)$$
$$= \int_{-\infty}^{0}\int_{-\infty}^{0}\int_{0}^{\infty} f_\Theta(u_1, u_2, u_3) du_1 du_2 du_3$$

where $f_\Theta(u_1, u_2, u_3)$ denotes the probability density function (PDF) of the multivariate Gaussian distribution with parameter vector $\Theta$, i.e., $$f_\Theta(\vec{u}) = (2\pi)^{-3/2}[\Sigma]^{-1/2}\exp\left(-\frac{1}{2}(\vec{u}-\vec{\mu})'\Sigma^{-1}(\vec{u}-\vec{\mu})\right). \quad \text{Eq. [3a]}$$

In one embodiment, numerical computations are performed using the Genz-Bretz algorithm, as implemented by the pmvnorm(.) function in R package mvtnorm. R is an integrated suite of software facilities for data manipulation, calculation and graphical display, which is available from the R Foundation (https://www.r-project.org/foundation/).

An advantage of parametrizing $\vec{\pi}$ using the multivariate probit model is that it allows model parameters to be separated where actual data is available, i.e., the mean vector $(\mu_1, \mu_2, \mu_3)$ and the correlation parameter r between linear 102 and OTT 104, versus parameters for which there is no data (i.e., correlation parameters v and w).

The correlation parameters v and w may be calibrated, in one embodiment, using data from suitably equipped televisions, such as televisions available from Vizio, Inc., that are capable of differentiating what type of platform 206 (e.g., linear 102, OTT 104, or YouTube 106). is displaying particular content items. For example, the ACR function within a Vizio television not only detects the particular content item playing on the screen, but it may also detect that it is being played by YouTube 106 (by finding a YouTube® logo) or by OTT (by finding a Netflix® logo). While such platform-identified impression data represent only a sample of the total linear 102, OTT 104, and YouTube 106 impressions for a population, it can be used to estimate the extent of the overlaps illustrated in FIG. 1 and thus the correlation parameters v and w. For example, the Vizio "panel" data (available from iSpot-UM in one embodiment) may indicate the chances of a person watching a content item on YouTube 106 if they are also watching the content item on linear 102 (or OTT 104).

Estimation of Model Parameters $\mu_1, \mu_2, \mu_3, r$

As discussed earlier, the following "ground truth" data are available:
(From ACR data via the first platform 206) Total Linear Reach $\pi_{1\cdot\cdot}$
(From iSpot pixel data via the second platform 206) Total OTT Reach $\pi_{\cdot 1\cdot}$
(From ADH data via the Nth platform 206) Total YouTube Reach $\pi_{\cdot\cdot 1}$ (From the overlap calculator 108) Linear and OTT overlap $\pi_{11\cdot}$.

The structure of the multivariate probit model allows for direct estimation of the model parameters $\mu_1, \mu_2, \mu_3, r$. Specifically, for the mean parameter $\mu_1$, through the marginal distribution for the first component in Eq. [1]-[2], it follows that:

$$u_1 \sim N(\mu_1, 1) \quad \text{Eq. [4]}$$
$$[z_1 = 1] \Leftrightarrow [u_1 > 0] \quad \text{Eq. [5]}$$

Thus, given total linear reach $\pi_{1\cdot\cdot}$, it follows that:

$$\pi_{1\cdot\cdot} = Pr(z_1 = 1) = Pr(u_1 > 0) = \Phi(\mu_1) \quad \text{Eq. [6]}$$

Hence, the estimator for $\mu_1$ is:

$$\hat{\mu}_1 = \Phi^{-1}(\pi_{1\cdot\cdot}) \quad \text{Eq. [7]}$$

Similarly, it follows that:

$$\hat{\mu}_2 = \Phi^{-1}(\pi_{\cdot 1\cdot}) \quad \text{Eq. [8]}$$
$$\hat{\mu}_3 = \Phi^{-1}(\pi_{\cdot\cdot 1}). \quad \text{Eq. [9]}$$

Next, to estimate the correlation parameter r, which governs the correlation between linear 102 and OTT 104, the first two components of Eq. [1] are marginalized, and the estimators $\hat{\mu}_1$ and $\hat{\mu}_2$ from Eq. [7] and [8] (respectively) are inserted. Through the properties of the multivariate Gaussian distribution, it follows that:

$$\begin{pmatrix} u_1 \\ u_2 \end{pmatrix} \sim MVN\left(\begin{pmatrix} \hat{\mu}_1 \\ \hat{\mu}_2 \end{pmatrix}, \begin{pmatrix} 1 & r \\ r & 1 \end{pmatrix}\right) \quad \text{Eq. [10]}$$

Thereafter, r is estimated using data on the overlap between linear and OTT ($\pi_{11\cdot}$). While a close-form estimator for r is not available, r can be numerically solved for through the following. constrained minimization problem:

$$\hat{r} = \underset{r}{\mathrm{argmin}}\left(\left|\pi_{11\cdot} - \int_0^\infty\int_0^\infty f_{\hat{\mu}_1,\hat{\mu}_2,r}(u_1, u_2)du_1 du_2\right|\right) \quad \text{Eq. [11]}$$

where the argmin is taken with respect to r, over the range $(-1, +1)$. The univariate optimization problem in Eq. [11] may be solved, for example, using the optimize( ) function in R.

Estimation of Parameters (v, w)

Calibrated parameters $(\mu_1, \mu_2, \mu_3, r)$ are available with known information from the first and second statistics 204. However, for parameters v and w, "ground truth" data is unavailable. As noted above, to calibrate these parameters, Vizio panel data is used representing the observed overlaps in impressions for linear 102, OTT 104, and YouTube on Vizio, Inc. or other similarly equipped televisions. Specifically, the estimation of $\hat{v}$, $\hat{w}$ follows an approach that is analogous to the estimation of $\hat{r}$ in Eq. [11], but with different data pairs, i.e., the 2×2 contingency table for {Linear, YouTube} for $\hat{v}$ and for {OTT, YouTube} for $\hat{w}$.

Since two separate data sources are being utilized to calibrate different sets of model parameters, the resulting correlation matrix is positive in one embodiment, i.e., the correlation structure to be consistent. In the case of the correlation matrix $\Sigma$ in Eq. [1], the condition of positive semidefiniteness is satisfied if and only if:

$$-1 \le r, v, w \le +1 \qquad \text{Eq. [12]}$$

and $$1 + 2rvw - r^2 - v^2 - w^2 \ge 0 \qquad \text{Eq. [13]}$$

Eq. [13] can be derived by computing the determinant of the correlation matrix.

For instance, the matrix $$\begin{pmatrix} 1 & .8 & -.9 \\ .8 & 1 & .8 \\ -.9 & .8 & 1 \end{pmatrix}$$

does not satisfy Eq. [13], and hence is not a valid correlation matrix. To ensure that a valid correlation structure is specified, the conditions stated in Eq. [12] and Eq. [13] may be checked after model estimation.

Example of Reach Estimation

The aforementioned approach was tested on data from a particular brand over a two month period. As discussed, the following "ground truth" data is known (the total number of P18+, or the people aged 18+ in the US, is taken to be 255.3 M):

1. Total Linear Reach=0.5607
2. Total OTT Reach=0.1029
3. Total YouTube Reach=0.0939 (Uniq_user/255.3 M=23973077/255.3 M=0.0939. uniq_user is taken from ADH data.)
4. Linear-OTT overlap=0.0425

In other words, based on ground truth data, the total reach by linear 102 is approximately 56%, while the total reach by OTT 104 is 10%, and the total reach by YouTube 106 is 9%. Based on data from the overlap calculator 208, the overlap between linear 102 and OTT 104 is approximately 4%. The multivariate probit model allows the reach estimator 214 to estimate how reach is distributed over all of the areas shown in FIG. 1 based on the aforementioned data.

Using the procedures described above, $\hat{\mu}_1 = \Phi^{-1}$(total linear % reach)=0.1527, $\hat{\mu}_2 = \Phi^{-1}$(total OTT % reach)=−1.2652, $\hat{\mu}_3 = \Phi^{-1}$(total YouTube % reach)=−1.3171, and $\hat{r}$=−0.0716 (which estimated from available data on {linear, OTT} overlap). In the latter case, the probit model induces certain relationships from the data, and the data is used to estimate $\hat{r}$ as well as the other correlation parameters.

Next, the correlation parameters, (v, w), are estimated using Vizio, Inc. panel data (available from iSpot.tv-UM), resulting in $\hat{v}$=−0.4206 and $\hat{w}$=−0.1003. In the present example, a −0.4206 correlation means that if a person is exposed to a content item via linear 102, they are less likely to also be exposed to YouTube 106.

Next, the correlation matrix is verified to be positive semidefinite. With the full set of multivariate Probit parameters, the reach probability vector (whether the household is or is not exposed) is calculated by the reach estimator 214 using the appropriate integrals. The result is shown in Table 1.

TABLE 1

Summary of reach estimates for each exposure group.

| | Description | Estimated Proportion |
|---|---|---|
| $\pi_{000}$ | Unexposed | 32.50% |
| $\pi_{001}$ | YouTube exclusive | 6.40% |
| $\pi_{010}$ | OTT exclusive | 4.47% |
| $\pi_{011}$ | OTT & YouTube only | 0.56% |
| $\pi_{100}$ | Linear exclusive | 48.51% |
| $\pi_{101}$ | Linear and YouTube only | 2.30% |
| $\pi_{110}$ | Linear and OTT only | 5.13% |
| $\pi_{111}$ | Linear, OTT, and YouTube | 0.13% |

Overlap Analysis for Impressions (Impressions Estimator 116)

The overlap analysis in terms of impressions is by nature more complicated than that of reach, as there are more parameters involved. Where N=3, there are twelve different variables to be estimated for impressions overlap analysis:

Linear Impressions $l_{100}$: Number of linear impressions on units (individuals) exposed only to linear $l_{101}$: Number of linear impressions on units exposed to both linear and YouTube, but not OTT $l_{110}$: Number of linear impressions on units exposed to both linear and OTT, but not YouTube $l_{111}$: Number of linear impressions on units exposed to all of linear, OTT, and YouTube (all 3)

OTT Impressions $t_{010}$: Number of OTT impressions on units exposed only to OTT $t_{011}$: Number of OTT impressions on units exposed to both OTT and YouTube, but not linear $t_{110}$: Number of OTT impressions on units exposed to linear and OTT, but not YouTube $t_{111}$: Number of OTT impressions on units exposed to all of linear, OTT, and YouTube (all 3)

YouTube Impressions $y_{001}$: Number of YouTube impressions on units exposed only to YouTube $y_{011}$: Number of YouTube impressions on units exposed to OTT and YouTube, but not linear $y_{101}$: Number of YouTube impressions on units exposed to linear and YouTube, but not OTT $y_{111}$: Number of YouTube impressions on units exposed to all of linear, OTT, and YouTube.

Given the above twelve unknown parameters, there are only five equations (through known data information) to solve for those unknowns. Specifically, the following information is available:

Total linear impressions $L_{TOT}=l_{100}+l_{101}+l_{110}+l_{111}$ (i.e., impression statistics for linear 102).

Total OTT impressions $T_{TOT}=t_{010}+t_{011}+t_{110}+t_{111}$ (i.e., impression statistics for OTT 104).

Total YouTube impressions $Y_{TOT}=y_{001}+y_{011}+y_{101}+y_{111}$ (i.e., impression statistics for YouTube 106)

Number of linear impressions overlapped with OTT $L_{ov.OTT}=l_{110}+l_{111}$ (i.e., a first set of overlap impression statistics)

Number of OTT impressions overlapped with linear $T_{ov.linear}=t_{110}+t_{111}$ (i.e., a second set of overlap impression statistics).

As before, the system of equations is under-identified as there are twelve unknowns in five equations. Additional modeling assumptions are therefore used to identify the system.

In one embodiment, the estimation algorithm is based on regularization, where departure from the proportionality assumption is "penalized." Specifically, departure from proportionality, as measured by sum of cross-entropy between the proportion of impressions in each bucket and the reach proportions, is penalized. This is motivated by analysis of "ground truth" data where the frequency of impressions (of the same type, i.e., linear/OTT) typically have a low degree of variability across different exposure buckets. Since average frequency=impressions/reach, a low variability of frequency across exposure buckets suggest that impressions are (roughly) proportional to reach to at least to a first order approximation. Thus, impressions are "regularized" towards the "equal frequency" assumption as a starting point.

Specifically, let $\vec{l}^* = (l_{100}, l_{101}, l_{110}, l_{111})/L_{TOT}$ and let $\vec{\pi}^{(L)} = (\hat{\pi}_{100}, \hat{\pi}_{101}, \hat{\pi}_{110}, \hat{\pi}_{111})/\hat{\pi}_{1\cdot\cdot}$. The following constrained optimization problem to estimate $(l_{100}, l_{101}, l_{110}, l_{111})$ may be established:

$$(\hat{l}_{100}, \hat{l}_{101}, \hat{l}_{110}, \hat{l}_{111}) = \underset{l_{100}, l_{101}, l_{110}, l_{111}}{\operatorname{argmin}} \sum_i \left| \log\left(\frac{\vec{l}_i^*}{\vec{\pi}_i^{(L)}}\right) \right| \quad \text{Eq. [14]}$$

Subject to $$\hat{l}_{100} + \hat{l}_{101} + \hat{l}_{110} + \hat{l}_{111} = L_{TOT} \quad \text{Eq. [15]}$$

$$\hat{l}_{110} + \hat{l}_{111} = L_{ov.OTT} \quad \text{Eq. [16]}$$

$$\hat{l}_{100}, \hat{l}_{101}, \hat{l}_{110}, \hat{l}_{111} \geq 0 \quad \text{Eq. [17]}$$

The constrained minimization may be solved numerically by first transforming it into an unconstrained minimization problem, then using the optim( ) function in R.

Similarly, the analogous constrained minimization problem may be established to estimate the OTT impression in each bucket. Specifically, $\vec{t}^* = (t_{010}, t_{011}, t_{110}, t_{111})/T_{TOT}$ and let $\vec{\pi}^{(T)} = (\hat{\pi}_{010}, \hat{\pi}_{011}, \hat{\pi}_{110}, \hat{\pi}_{111})/\hat{\pi}_{\cdot 1 \cdot}$. The following constrained optimization problem to estimate $(t_{010}, t_{011}, t_{110}, t_{111})$ may be established:

$$(\hat{t}_{010}, \hat{t}_{011}, \hat{t}_{110}, \hat{t}_{111}) = \underset{t_{010}, t_{011}, t_{110}, t_{111}}{\operatorname{argmin}} \sum_i \left| \log\left(\frac{\vec{t}_i^*}{\vec{\pi}_i^{(T)}}\right) \right| \quad \text{Eq. [18]}$$

Subject to $$\hat{t}_{010} + \hat{t}_{011} + \hat{t}_{110} + \hat{t}_{111} = T_{TOT} \quad \text{Eq. [19]}$$

$$\hat{t}_{110} + \hat{t}_{111} = T_{ov.linear} \quad \text{Eq. [20]}$$

$$\hat{t}_{010} + \hat{t}_{011} + \hat{t}_{110} + \hat{t}_{111} \geq 0 \quad \text{Eq. [21]}$$

Again, the constrained minimization is solved numerically by first transforming it into an unconstrained minimization problem, then using the optim( ) function in R.

Since there is not additional impression overlap information for YouTube 106, the constrained minimization for YouTube impressions reduces to proportionally assigning YouTube impression according to estimated reach (as calculated by the reach estimator 214), i.e., $$\hat{y}_{001} = Y_{TOT}\left(\frac{\hat{\pi}_{001}}{\hat{\pi}_{\cdot\cdot 1}}\right) \quad \text{Eq. [22]}$$

$$\hat{y}_{011} = Y_{TOT}\left(\frac{\hat{\pi}_{011}}{\hat{\pi}_{\cdot\cdot 1}}\right) \quad \text{Eq. [23]}$$

$$\hat{y}_{101} = Y_{TOT}\left(\frac{\hat{\pi}_{101}}{\hat{\pi}_{\cdot\cdot 1}}\right) \quad \text{Eq. [24]}$$

$$\hat{y}_{111} = Y_{TOT}\left(\frac{\hat{\pi}_{111}}{\hat{\pi}_{\cdot\cdot 1}}\right) \quad \text{Eq. [25]}$$

Example of Impression Estimation

Overlap analysis was performed for impressions of a particular brand obtained over two months, starting with the following "ground-truth" data:

Total linear impressions (M)=601.4 (from first statistics 204, e.g., ACR data)

Total OTT impressions (M)=38.9 (from second statistics 204, e.g., pixel data)

Total YouTube impressions (M)=90.9 (from nth statistics 204, e.g., ADH)

Number of linear impression overlapped with OTT (M)=37.6 (from overlap calculator 108)

Number of OTT impressions overlapped with linear (M)=20.2 (from overlap calculator 108).

Using the techniques described above, the estimates for impressions in different buckets (in millions) are shown in Table 2 below.

TABLE 2

Overlap analysis for Realtor.com

| | # Imps (in M) |
|---|---|
| Linear Impressions | |
| Exposed only to linear | 539.08 |
| Exposed to Linear and YouTube only (but not OTT) | 24.66 |
| Exposed to Linear and OTT only (but not YouTube) | 36.23 |
| Exposed to all three | 1.41 |
| OTT Impressions | |
| Exposed only to OTT | 16.63 |
| Exposed to Linear and OTT only (but not YouTube) | 19.68 |
| Exposed to OTT and YouTube only (but not Linear) | 2.11 |
| Exposed to all three | 0.50 |

TABLE 2-continued

Overlap analysis for Realtor.com

| | # Imps (in M) |
|---|---|
| YouTube Impressions | |
| Exposed only to YouTube | 61.99 |
| Exposed only to OTT and YouTube (but not linear) | 5.41 |
| Exposed only to Linear and YouTube (but not OTT) | 22.27 |
| Exposed to all three | 1.28 |

Figure 3:
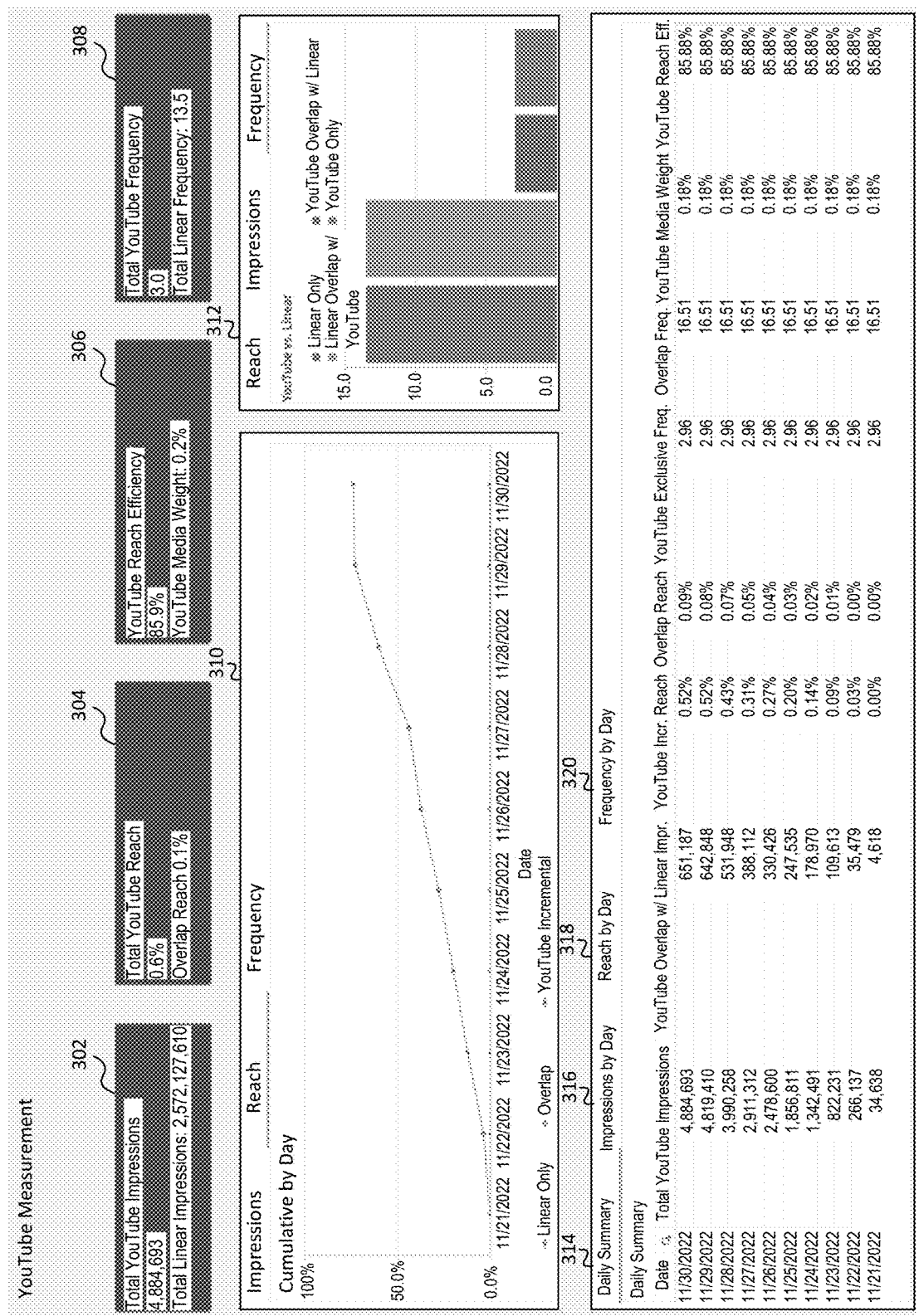
FIG. 3 is an example report of reach, impressions, and frequency.

A report generator 218 within the aggregation server 202 may generate a report 220 of the estimated reach and impressions shown in Tables 1 and 2, respectively. The report 220 may be presented in any suitable format, such as one or more tables and/or graphs. For example, as shown in FIG. 3, the report 220 may include estimates of the total YouTube impressions 302, total YouTube reach 304, YouTube reach efficiency 306, and total YouTube frequency 308. The report may also include a graph 310 of any or all of impressions per day, reach per day, or frequency per day, which may be selectable by a user to display only the desired quantities. The graph 310 may be a line graph (as shown), a bar graph, or another suitable type of graph. The graph 310 may have separate lines or rectangles to represent values of impressions, reach, and/or frequency for linear-only, overlap, and or YouTube incremental (i.e., where YouTube 106 extends beyond linear 102 and OTT 104).

Alternatively, or in addition, the report 220 may include a graph 312 of YouTube vs. Linear in terms of linear 102 only, YouTube 106 overlap with linear 102, linear 102 overlap with YouTube 106, and/or YouTube 106 only (or other possible combinations) selectively for each of reach, impressions, and frequency.

Finally, the report 220 may include various data tables, such as a daily summary 314 of total YouTube impressions, YouTube overlap with Linear impressions, YouTube incremental reach, overlap reach, YouTube exclusive frequency, overlap frequency, and YouTube media weight, which may be displayed for a number of dates. The report 220 may also include a data table for impressions by day 316, reach by day 318, and frequency by day 320.

Any or all of the foregoing quantities may be displayed in the report 220 in response to user selections. In some embodiments, the report 220 may be interactive, allowing a user to switch between different reports or quantities for different graphs or data tables. Alternatively, or in addition, the report 220 may also be presented in a static format, such as portable document format (PDF).

The report 220 may be provided to an end user via an output interface 222, such as a network interface, display device, or the like.

Figure 4:
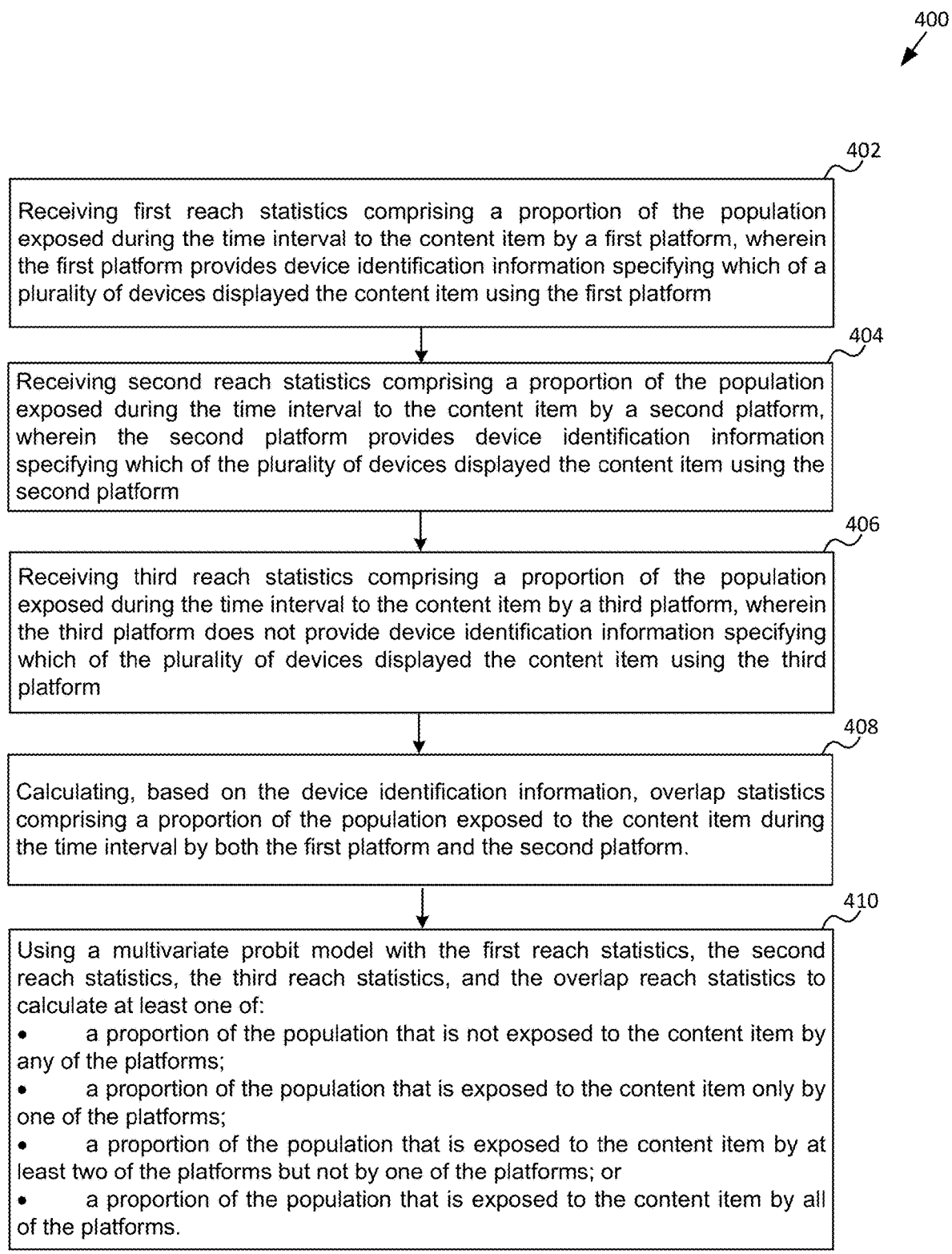
FIG. 4 is a flowchart of a computer-implemented method for determining the proportion of a population that is exposed during a time interval to a content item by one or a combination of a plurality of platforms.

FIG. 4 is a flowchart of a computer-implemented method 400 for determining the proportion of a population that is exposed during a time interval to a content item by one or a combination of a plurality of platforms. In one embodiment, the method 400 begins by receiving 402 first reach statistics comprising the proportion of the population exposed during the time interval to the content item by a first platform, wherein the first platform identifies which of a plurality of households or devices within the households displayed the content item using the first platform.

The method continues 400, in one embodiment, by receiving 404 second reach statistics comprising the proportion of the population exposed during the time interval to the content item by a second platform, wherein the second platform identifies the at least one of the household or the device that displayed the content item using the second platform.

The method 400 method continue by receiving 406 third reach statistics comprising the proportion of the population exposed during the time interval to the content item by a third platform, wherein the third platform does not identify which of the plurality of households or devices within the households displayed the content item using the third platform.

In one embodiment, the method 400 continues by calculating 408 overlap reach statistics comprising the proportion of the population exposed to the content item during the time interval by both the first platform and the second platform.

The method 400 may also include using 410 a multivariate probit model with the first reach statistics, the second reach statistics, the third reach statistics, and the overlap reach statistics to calculate at least one of:
 the proportion of the population that is not exposed to the content item during the time interval by any of the platforms;
 the proportion of the population that is exposed to the content item during the time interval by only one of the platforms;
 the proportion of the population that is exposed to the content item during the time interval by at least two of the platforms but not by one of the platforms; or
 the proportion of the population that is exposed to the content item during the time interval by all of the platforms.

The systems and methods described herein can be implemented in hardware, software, firmware, or combinations of hardware, software and/or firmware. In some examples, systems described in this specification may be implemented using a non-transitory computer readable medium storing computer executable instructions that when executed by one or more processors of a computer cause the computer to perform operations. Computer readable media suitable for implementing the control systems described in this specification include non-transitory computer-readable media, such as disk memory devices, chip memory devices, programmable logic devices, random access memory (RAM), read only memory (ROM), optical read/write memory, cache memory, magnetic read/write memory, flash memory, and application-specific integrated circuits. In addition, a computer readable medium that implements a control system described in this specification may be located on a single device or computing platform or may be distributed across multiple devices or computing platforms.

One skilled in the art will readily appreciate that the present disclosure is well adapted to carry out the objects and obtain the ends and advantages mentioned, as well as those inherent therein. The present disclosure described herein are presently representative of preferred embodiments, are exemplary, and are not intended as limitations on the scope of the present disclosure. Changes therein and other uses will occur to those skilled in the art which are encompassed within the spirit of the present disclosure as defined by the scope of the claims.

No admission is made that any reference, including any non-patent or patent document cited in this specification, constitutes prior art. In particular, it will be understood that, unless otherwise stated, reference to any document herein does not constitute an admission that any of these documents forms part of the common general knowledge in the art in the United States or in any other country. Any discussion of the references states what their authors assert, and the applicant reserves the right to challenge the accuracy and pertinence of any of the documents cited herein. All references cited herein are fully incorporated by reference, unless explicitly indicated otherwise. The present disclosure shall control in the event there are any disparities between any definitions and/or description found in the cited references.

What is claimed is:

1. A computer-implemented method for determining a proportion of a population that is exposed during a time interval to a content item by one or a combination of a plurality of platforms, the computer-implemented method comprising:

receiving, by an aggregation server from a plurality of automatic content recognition (ACR) systems integrated into a first plurality of television sets, first reach statistics comprising the proportion of the population exposed during the time interval to the content item by a first platform, wherein the first platform includes a linear television platform, the plurality of ACR systems sample audio and/or video from the content item and compare the sampled audio and/or video with a database of content items to identify the content item by its unique characteristics, the first reach statistics identify at least one of a household or device that displayed the content item using the first platform;

receiving, by the aggregation server from a plurality of pixel tag tracking systems integrated into a second plurality of television sets, second reach statistics comprising the proportion of the population exposed during the time interval to the content item by a second platform, wherein the second platform includes a streaming platform, the plurality of pixel tracking systems search for pixel tags embedded in the content item to identify the content item, and the second reach statistics identify the at least one of the household or the device that displayed the content item using the second platform;

receiving, by the aggregation server from a video sharing system, third reach statistics comprising the proportion of the population exposed during the time interval to the content item by a third platform, the third platform including the video sharing system and the content item including a video displayed by the video sharing system, wherein the third platform does not identify the at least one of the household or the device that displayed the content item using the third platform;

calculating, by at least one processor in operable communication with the aggregation server, overlap reach statistics comprising the proportion of the population exposed to the content item during the time interval by both the first platform and the second platform;

calculating, by the at least one processor, using a multivariate probit model with the first reach statistics, the second reach statistics, the third reach statistics, and the overlap reach statistics to calculate proportion information including at least one of:

the proportion of the population that is not exposed to the content item during the time interval by any of the platforms;

the proportion of the population that is exposed to the content item during the time interval by only one of the platforms;

the proportion of the population that is exposed to the content item during the time interval by at least two of the platforms but not by one of the platforms; or the proportion of the population that is exposed to the content item during the time interval by all of the platforms;

generating, by the at least one processor, a report including the proportion information; and transmitting, by a network interface, the report for display on a display device.

2. The computer-implemented method of claim 1, wherein using the multivariate probit model comprises using the multivariate probit model to calculate the proportion of the population that is not exposed to the content item during the time interval by the first, second, or third platform.

3. The computer-implemented method of claim 1, wherein using the multivariate probit model comprises using the multivariate probit model to calculate the proportion of the population that is exposed to the content item during the time interval by only the third platform.

4. The computer-implemented method of claim 1, wherein using the multivariate probit model comprises using the multivariate probit model to calculate the proportion of the population that is exposed to the content item during the time interval by only the second platform or by only the first platform.

5. The computer-implemented method of claim 1, wherein using the multivariate probit model comprises using the multivariate probit model to calculate the proportion of the population that is exposed to the content item during the time interval by both the second platform and the third platform, but not on the first platform.

6. The computer-implemented method of claim 1, wherein using the multivariate probit model comprises using the multivariate probit model to calculate the proportion of the population that is exposed to the content item during the time interval by both the first platform and the third platform, but by the second platform.

7. The computer-implemented method of claim 1, wherein using the multivariate probit model comprises using the multivariate probit model to calculate the proportion of the population that is exposed to the content item on both the first platform and the second platform, but not on the third platform.

8. The computer-implemented method of claim 1, wherein using the multivariate probit model comprises using the multivariate probit model to calculate the proportion of the population that is exposed to the first platform, the second platform, and the third platform.

9. The computer-implemented method of claim 1, wherein calculating the overlap reach statistics comprises calculating the overlap reach statistics using an Internet Protocol (IP) address.

10. The computer-implemented method of claim 1, wherein the first platform comprises a linear platform.

11. The computer-implemented method of claim 1, wherein the second platform comprises over-the-top (OTT) platform.

12. The computer-implemented method of claim 1, wherein the multivariate probit model takes as input a mean vector corresponding to a total reach of the first platform, the second platform, and the third platform, respectively, as well as correlation matrix including correlation parameters relating a probability of an individual watching a first content item on both the first platform and the second platform, a probability of the individual watching the first content item on both the first platform and the third platform, and the probability of the individual watching the first content item on both the second platform and the third platform.

13. The computer-implemented method of claim 1, wherein the multivariate probit model is expressed by:

$$\begin{pmatrix} u_1 \\ u_2 \\ u_3 \end{pmatrix} \sim MVN\left(\begin{bmatrix} \mu_1 \\ \mu_2 \\ \mu_3 \end{bmatrix}, \begin{bmatrix} 1 & r & v \\ r & 1 & w \\ v & w & 1 \end{bmatrix}\right)$$

$$[z_i = 1] \Leftrightarrow [u_i > 0]$$

where:
MVN is a multivariate normal distribution;
$z_1$, $z_2$, and $z_3$ are indicator variables for exposure to the content item by the first platform, the second platform, and the third platform, respectively, and take a value of 1 if exposure occurs during the time interval or is 0 otherwise;
$u_1$, $u_2$, and $u_3$ are latent variables;
$\mu_1$, $\mu_2$, and $\mu_3$ are mean parameters and correspond to total reach for the first platform, total reach for the second platform, and total reach for the third platform and are obtained from the first reach statistics, second reach statistics, and third reach statistics, respectively;
r is a correlation parameter between the first platform and the second platform;
v is a correlation parameter between the first platform and the third platform; and
w is a correlation parameter between the first platform and the third platform.

14. The computer-implemented method of claim 13, wherein r is estimated by:

$$r = \underset{r}{\operatorname{argmin}}\left(\left|O - \int_0^\infty \int_0^\infty f_{\hat{\mu}_1,\hat{\mu}_2,r}(u_1, u_2) du_1 du_2\right|\right)$$

where the argmin is taken with respect to r, over a range (−1, +1), and
O is the proportion of the population exposed to the content item during the time interval by both the first platform and the second platform.

15. The computer-implemented method of claim 13, wherein v is estimated by:

$$v = \underset{v}{\operatorname{argmin}}\left(\left|O - \int_0^\infty \int_0^\infty f_{\hat{\mu}_1,\hat{\mu}_3,v}(u_1, u_3) du_1 du_3\right|\right)$$

where the argmin is taken with respect to v, over a range (−1, +1), and
O is the proportion of the population exposed to the content item during the time interval by both the first platform and the third platform.

16. The computer-implemented method of claim 13, wherein w is estimated by:

$$w = \underset{w}{\operatorname{argmin}}\left(\left|O - \int_0^\infty \int_0^\infty f_{\hat{\mu}_2,\hat{\mu}_3,v}(u_2, u_3) du_2 du_3\right|\right)$$

where the argmin is taken with respect to v, over a range (−1, +1), and
O is the proportion of the population exposed to the content item during the time interval by both the second platform and the third platform.

17. The computer-implemented method of claim 13, wherein the proportion of the population that is exposed to the content item during the time interval by only the third platform ($\pi_{001}$) is calculated by:

$$\pi_{001} = \int_{-\infty}^0 \int_{-\infty}^0 \int_0^\infty f_\Theta(u_1, u_2, u_3) du_1 du_2 du_3$$

where $f_\Theta(u_1, u_2, u_3)$ denotes a probability density function (PDF) of the multivariate Gaussian distribution with parameter vector θ, wherein:

$$f_\Theta(\vec{u}) = (2\pi)^{-3/2} \lceil \sum \rceil^{-1/2} \exp\left(-\frac{1}{2}(\vec{u}-\vec{\mu})\prime \sum{}^{-1}(\vec{u}-\vec{\mu})\right).$$

18. The computer-implemented method of claim 13, wherein the proportion of the population that is exposed to the content item during the time interval by only the second platform ($\pi_{010}$) is calculated by:

$$\pi_{010} = \int_{-\infty}^0 \int_0^\infty \int_{-\infty}^0 f_\Theta(u_1, u_2, u_3) du_1 du_2 du_3$$

where $f_\theta(u_1, u_2, u_3)$ denotes a probability density function (PDF) of the multivariate Gaussian distribution with parameter vector θ, wherein:

$$f_\Theta(\vec{u}) = (2\pi)^{-3/2} \lceil \sum \rceil^{-1/2} \exp\left(-\frac{1}{2}(\vec{u}-\vec{\mu})\prime \sum{}^{-1}(\vec{u}-\vec{\mu})\right).$$

19. The computer-implemented method of claim 13, wherein the proportion of the population that is exposed to the content item during the time interval by only the first platform ($\pi_{100}$) is calculated by:

$$\pi_{100} = \int_0^\infty \int_{-\infty}^0 \int_{-\infty}^0 f_\Theta(u_1, u_2, u_3) du_1 du_2 du_3$$

where $f_\theta(u_1, u_2, u_3)$ denotes a probability density function (PDF) of the multivariate Gaussian distribution with parameter vector θ, wherein:

$$f_\Theta(\vec{u}) = (2\pi)^{-3/2} \lceil \sum \rceil^{-1/2} \exp\left(-\frac{1}{2}(\vec{u}-\vec{\mu})\prime \sum{}^{-1}(\vec{u}-\vec{\mu})\right).$$

20. The computer-implemented method of claim 13, wherein the proportion of the population that is not exposed to the content item during the time interval by the first platform, the second platform, or the third platform ($\pi_{000}$) is calculated by:

$$\pi_{000} = \int_{-\infty}^0 \int_{-\infty}^0 \int_{-\infty}^0 f_\Theta(u_1, u_2, u_3) du_1 du_2 du_3$$

where $f_\theta(u_1, u_2, u_3)$ denotes a probability density function (PDF) of the multivariate Gaussian distribution with parameter vector θ, wherein:

$$f_\Theta(\vec{u}) = (2\pi)^{-3/2} \lceil \sum \rceil^{-1/2} \exp\left(-\frac{1}{2}(\vec{u}-\vec{\mu})'\sum^{-1}(\vec{u}-\vec{\mu})\right).$$

21. The computer-implemented method of claim 13, wherein the proportion of the population that is exposed to the content item during the time interval by all three platforms ($\pi_{111}$) is calculated by:

$$\pi_{111} = \int_0^\infty \int_0^\infty \int_0^\infty f_\Theta(u_1, u_2, u_3) du_1 du_2 du_3$$

where $f_\Theta(u_1, u_2, u_3)$ denotes a probability density function (PDF) of the multivariate Gaussian distribution with parameter vector $\theta$, wherein:

$$f_\Theta(\vec{u}) = (2\pi)^{-3/2} \lceil \sum \rceil^{-1/2} \exp\left(-\frac{1}{2}(\vec{u}-\vec{\mu})'\sum^{-1}(\vec{u}-\vec{\mu})\right).$$

22. The computer-implemented method of claim 13, wherein the proportion of the population that is exposed to the content item during the time interval by both the first platform and the second platform, but not the third platform ($\pi_{110}$) is calculated by:

$$\pi_{110} = \int_0^\infty \int_0^\infty \int_{-\infty}^0 f_\Theta(u_1, u_2, u_3) du_1 du_2 du_3$$

where $f_\Theta(u_1, u_2, u_3)$ denotes a probability density function (PDF) of the multivariate Gaussian distribution with parameter vector $\theta$, wherein:

$$f_\Theta(\vec{u}) = (2\pi)^{-3/2} \lceil \sum \rceil^{-1/2} \exp\left(-\frac{1}{2}(\vec{u}-\vec{\mu})'\sum^{-1}(\vec{u}-\vec{\mu})\right).$$

23. The computer-implemented method of claim 13, wherein the proportion of the population that is exposed to the content item during the time interval by both the first platform and the third platform, but not the second platform ($\pi_{101}$) is calculated by:

$$\pi_{101} = \int_0^\infty \int_{-\infty}^0 \int_0^\infty f_\Theta(u_1, u_2, u_3) du_1 du_2 du_3$$

where $f_\Theta(u_1, u_2, u_3)$ denotes a probability density function (PDF) of the multivariate Gaussian distribution with parameter vector $\theta$, wherein:

$$f_\Theta(\vec{u}) = (2\pi)^{-3/2} \lceil \sum \rceil^{-1/2} \exp\left(-\frac{1}{2}(\vec{u}-\vec{\mu})'\sum^{-1}(\vec{u}-\vec{\mu})\right).$$

24. The computer-implemented method of claim 13, wherein the proportion of the population that is exposed to the content item during the time interval by both the second platform and the third platform, but not the first platform ($\pi_{011}$) is calculated by:

$$\pi_{011} = \int_{-\infty}^0 \int_0^\infty \int_0^\infty f_\Theta(u_1, u_2, u_3) du_1 du_2 du_3$$

where $f_\Theta(u_1, u_2, u_3)$ denotes a probability density function (PDF) of the multivariate Gaussian distribution with parameter vector $\theta$, wherein:

$$f_\Theta(\vec{u}) = (2\pi)^{-3/2} \lceil \sum \rceil^{-1/2} \exp\left(-\frac{1}{2}(\vec{u}-\vec{\mu})'\sum^{-1}(\vec{u}-\vec{\mu})\right).$$

25. A system for determining a proportion of a population that is exposed during a time interval to a content item by one or a combination of a plurality of platforms, the system comprising:
an aggregation server configured to:
receive, from a plurality of automatic content recognition (ACR) systems integrated into a first plurality of television sets, first reach statistics comprising the proportion of the population exposed during the time interval to the content item by a first platform, wherein the first platform includes a linear television platform, the plurality of ACR systems sample audio and/or video from the content item and compare the sampled audio and/or video with a database of content items to identify the content item by its unique characteristics, the first reach statistics identify at least one of a household or device that displayed the content item using the first platform;
receive, from a plurality of pixel tag tracking systems integrated into a second plurality of television sets, second reach statistics comprising the proportion of the population exposed during the time interval to the content item by a second platform, wherein the second platform includes a streaming platform, the plurality of pixel tracking systems search for pixel tags embedded in the content item to identify the content item, and the second reach statistics identify the at least one of the household or the device that displayed the content item using the second platform; and
receive, from a video sharing system, third reach statistics comprising the proportion of the population exposed during the time interval to the content item by a third platform, the third platform including the video sharing system and the content item including a video displayed by the video sharing system, wherein the third platform does not identify the at least one of the household or the device that displayed the content item using the third platform;
at least one processor in operable communication with the aggregation server and configured to:
calculate overlap reach statistics comprising the proportion of the population exposed to the content item during the time interval by both the first platform and the second platform; and
use a multivariate probit model with the first reach statistics, the second reach statistics, the third reach statistics, and the overlap reach statistics to generate a report including proportion information at least one of:
the proportion of the population that is not exposed to the content item during the time interval by any of the platforms;

the proportion of the population that is exposed to the content item during the time interval by only one of the platforms;

the proportion of the population that is exposed to the content item during the time interval by at least two of the platforms but not by one of the platforms; or the proportion of the population that is exposed to the content item during the time interval by all of the platforms; and a network interface configured to transmit the report for display on a display device.

* * * * *